Jan. 2, 1940.  J. S. ANDREWS  2,185,364
COMBINED AUTOMATIC AND MANUALLY CONTROLLED SAFETY VALVE
Filed June 18, 1937
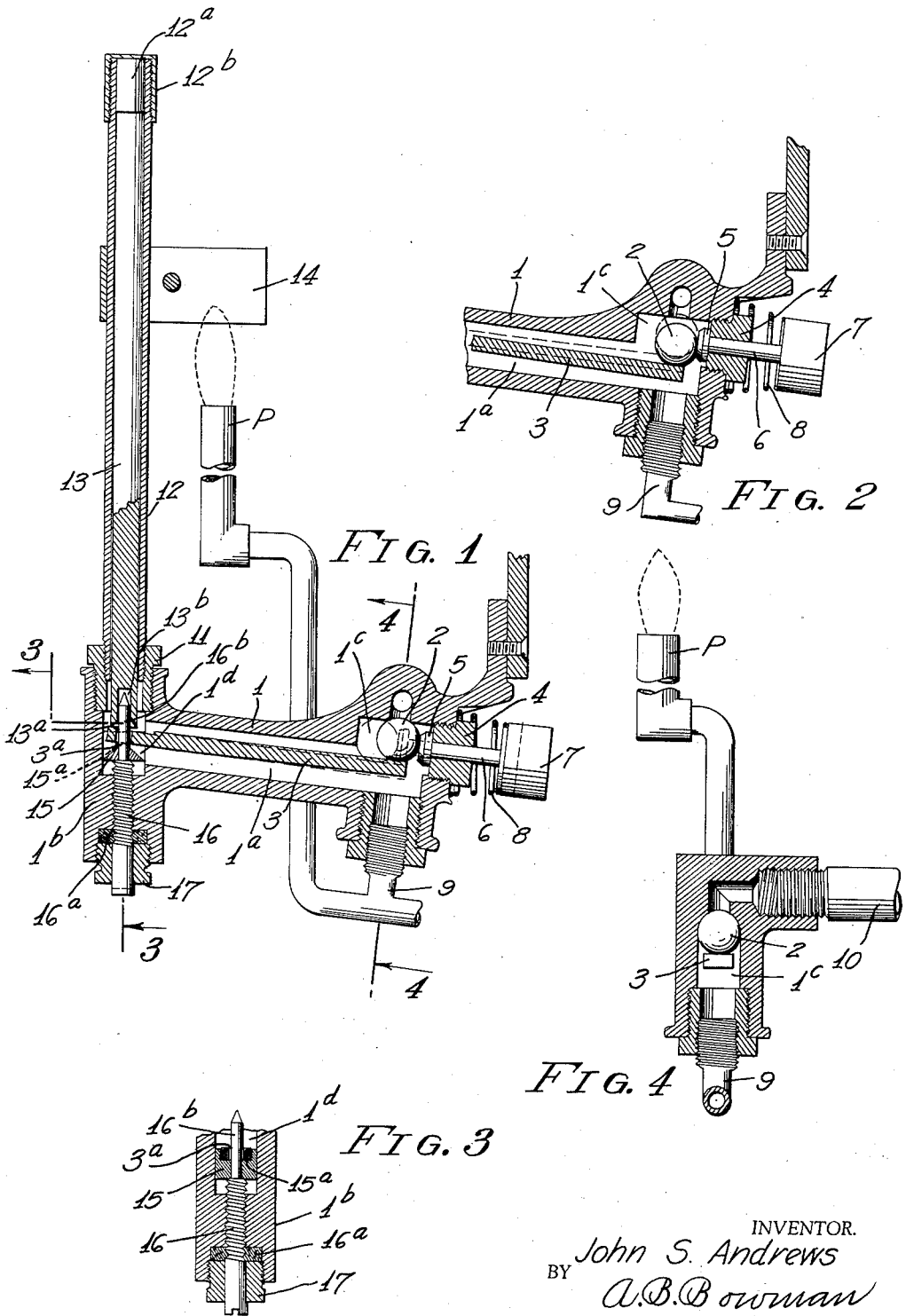
INVENTOR.
John S. Andrews
BY A. B. Bowman
ATTORNEY.

Patented Jan. 2, 1940

2,185,364

UNITED STATES PATENT OFFICE 2,185,364

COMBINED AUTOMATIC AND MANUALLY CONTROLLED SAFETY VALVE

John S. Andrews, Los Angeles, Calif.

Application June 18, 1937, Serial No. 148,931

6 Claims. (Cl. 158—117.1)

My invention relates to a combined automatic and manually controlled safety valve mechanism, particularly adapted for fluid burners such as gas burners, and the objects of my invention are:

First to provide a valve mechanism for supplying fluid fuel to burners which will automatically close when the pilot light is extinguished or when the burner is extinguished where there is no pilot light and heat from the burner is conducted to the thermostat by direct blaze or otherwise;

Second, to provide a valve mechanism of this class which is very sensitive, and therefore positive in its action;

Third, to provide a valve mechanism of this class which is adjustable throughout;

Fourth, to provide a valve mechanism of this class which may be manually controlled independent of the automatic action;

Fifth, to provide a valve mechanism of this class which when automatically closed may be manually opened for starting operation;

Sixth, to provide a highly sensitive combined automatic and manually controlled safety valve for fluid fuel burners; and Seventh, to provide a valve mechanism of this class which is positive in its action so that the flow of fluid fuel is positively stopped in case the pilot or gas burner is extinguished in any way;

Eighth, to provide a mechanism of this class which is very simple and economical of construction, automatic in its action, applicable for use in connection with various types of burners, efficient in its action, and which will not readily deteriorate or get out of order.

With these and other objects in view as will appear hereinafter, my invention consists of certain novel features of construction, combination, and arrangement of parts and portions as will be hereinafter described in detail and particularly set forth in the appended claims, reference being had to the accompanying drawing, and to the characters of reference thereon which form a part of this application in which:

Figure 1 is a sectional view of my valve mechanism complete showing some of the parts in elevation to facilitate the illustration and showing some of the parts and portions fragmentarily and showing the valve closed and in inoperative position and showing by dotted lines the valve when shifted manually to operating position; Fig. 2 is a fragmentary sectional view of the ball valve mechanism showing the valve open and showing by dash lines the valve in closed position; Fig. 3 is a sectional view from the line 3—3 of Fig. 1; and Fig. 4 is a sectional view from the line 4—4 of Fig. 1.

Similar characters of reference refer to similar parts and portions throughout the several views of the drawing:

The main casing 1, ball valve 2, ball valve supporting lever 3, plug 4, plunger 5, plunger stem 6, plunger handle 7, plunger spring 8, outlet tube 9, inlet tube 10, thermostat bushing 11, thermostat member 12, thermostat member 13, pilot heat conductor 14, ball valve supporting lever support 15, thermostat adjusting screw 16, and thermostat adjusting screw bushing screw 17, constitute the principal parts and portions of my combined automatic and manually controlled safety valve mechanism.

The casing 1 is shaped as shown best in Fig. 1 of the drawing provided with a central opening 1a. It is provided with a vertical portion 1b and with an enlarged valve chamber 1c. Shiftably mounted in the opening 1a is the ball valve supporting lever 3 which is pivotally supported near one end upon a support 15 which is provided with a sharp edge fulcrum portion 15a and is supported in a chamber 1d in the casing 1 and is adjustable upwardly and downwardly by means of the thermostat adjusting screw 16 which is screw threaded in the casing 1 provided with packing 16a which is held by means of the bushing 17. This adjusting screw 16 is provided with an upwardly extending reduced portion 16b which extends through a hole 3a extending vertically through the one end of the lever 3. The extended end of the lever 3 rests at its upper side against the lower fin edge 13a of thermostat member 13 shown best in Fig. 1 of the drawing. This thermostat member 13 is provided with a bore 13b in its lower end which is adapted to receive the upper pointed end of the member 16b. Screw threaded in the casing 1 is a bushing 11 in which is screw threaded the lower end of the thermostat member 12 which surrounds and encloses the thermostat member 13. This member 12 is provided in its upper end with a plug 12a which rests against the upper end of the thermostat member 13 and said member 12 is provided with a cap 12b for supporting the plug in certain relation with the thermostat member 12. Secured on the thermostat member 12 is the pilot light or gas burner heat conductor 14 which extends outwardly and is adapted to be engaged by the light from the pilot or a portion of the gas burner through the member 14 to the thermostat member 12 so that when the pilot light or gas burner is in operation, the thermostat member 12 is expanded and permits the thermostat member 13 to rise in the member 12 permitting the lever 3 at its upper end to move downwardly and therefore dropping the ball 2 downwardly as shown by solid lines in Fig. 2 of the drawing so that the valve is open. If, however, the pilot light or portion of gas burner is extinguished for any reason, the member 14 cools off and the member 12 contracts carrying the member 13 downwardly and closing the valve as shown by solid lines in Fig. 1 of the drawing.

In order to manually operate the ball valve for starting the heater or for manual operation otherwise, there is provided a bushing 4 communicating with the chamber 1c in which is shiftably mounted the plunger stem 6 which is provided with a plunger member 5 on the inner side of said bushing adapted to engage the ball valve 2, and on the outwardly extended end of the plunger stem 6 is a handle member 7, and interposed between the handle member 7 and the casing around the bushing 4 is a plunger spring 8 which tends to hold the handle 7 outwardly. Upon pressure upon the handle 7, the spring 8 is compressed and the ball valve 2 is forced and wedged inwardly as shown by dash lines in Fig. 1 of the drawing opening the valve and permitting the fluid to pass through the casing, the fluid outlet being the tube 9 and the inlet the tube 10. It will be here noted that this valve 2 remains in this dash line wedged position as shown in Fig. 1 of the drawing by reason of the frictional contact between the casing and the member 3 after the handle 7 is released until sufficient heat is applied to the thermostat by the pilot light or burner, which takes approximately one minute when the ball is released and it rolls on the inclined member 3 into the solid line position shown in Fig. 2 of the drawing. Thus it will be seen that if the pilot light or portion of gas burner is extinguished or the operation ceases, the thermostat members 12 and 13 will cause the lever 3 to rise at its free end carrying with it the ball valve 2 and closing the fluid passage through the valve casing as shown by solid lines in Fig. 1 of the drawing thus automatically closing the valve. However, the valve may be manually opened by pressure on the handle 7 shifting the ball valve 2 out of relation with its seat and permitting the fluid to pass through the valve casing.

It will be here noted that the pilot light shown connected with the outlet side of the casing may be omitted and no pilot used so long as the main gas burner has a flame or otherwise conducts heat to the member 14 in which case the valve will close in case the burner is extinguished and therefore the pilot light may be omitted if desired. The pilot light conductor P shown in Figs. 1 and 4 would then be the burner conductor instead of the pilot conductor.

Though I have shown and described a particular construction, combination, and arrangement of parts and portions, I do not wish to be limited to this particular construction, combination, and arrangement, but desire to include in the scope of my invention, the construction, combination, and arrangement substantially as set forth in the appended claims.

Having thus described my invention, what I claim as new and desire to secure by Letters Patent is:

1. In a combined automatic and manually controlled safety valve mechanism, a thermostatically controlled lever positioned on a slight incline to the horizontal and pivotally mounted near its higher end, a casing in which said lever is mounted provided with an enlarged chamber at the free end of said lever, a valve seat positioned in the upper side of said casing surrounding the inlet to said valve above the extended free end of said lever, a ball valve interposed between said seat and said lever and resting on said lever, and a plunger member shiftably mounted in said casing and extending outwardly thereof arranged to engage said ball valve for shifting it along said lever and wedging it between the upper wall of said chamber and said lever.

2. In a combined automatic and manually controlled safety valve mechanism, a thermostatically controlled lever positioned on a slight incline to the horizontal and pivotally mounted near its higher end, a casing in which said lever is mounted provided with an enlarged chamber at the free end of said lever, a valve seat positioned in the upper side of said casing surrounding the inlet to said valve above the extended free end of said lever, a ball valve interposed between said seat and said lever and resting on said lever, a plunger member shiftably mounted in said casing and extending outwardly thereof arranged to engage said ball valve for shifting it along said lever and wedging it between the upper wall of said chamber and said lever, and means for adjusting the lever support relatively to the thermostat.

3. In a combined automatic and manually controlled safety valve mechanism for fluid burners, the combination with a burner, of a casing provided with a fluid inlet at its upper side and a fluid outlet at its lower side, a ball valve positioned in said casing seating against said inlet, an inclined lever fulcrumed near its higher end and serving as a support for the ball valve at its lower free end, a plunger positioned in said casing adapted to engage said ball valve, a stem reciprocally mounted in said casing in connection with said plunger, a handle on the extended end of said stem outwardly of said casing.

4. In a combined automatic and manually controlled safety valve mechanism for fluid burners, the combination with a burner, of a casing provided with a fluid inlet at its upper side and a fluid outlet at its lower side, a ball valve positioned in said casing seating against said inlet, an inclined lever fulcrumed near its higher end and serving as a support for the ball valve at its lower free end, a plunger positioned in said casing adapted to engage said ball valve, a stem reciprocally mounted in said casing in connection with said plunger, a handle on the extended end of said stem outwardly of said casing, and a spring interposed between said handle and said casing around said stem.

5. In a combined automatic and manually controlled safety valve mechanism for fluid burners, the combination with a burner, of a thermostatically controlled lever positioned on a slight incline to the horizontal and pivotally mounted near its higher end, a casing in which said lever is mounted provided with an enlarged chamber at the free end of said lever, a valve seat positioned in the upper side of said casing surrounding the inlet to said valve above the extended free end of said lever, a ball valve interposed between said seat and said lever and arranged to be raised and lowered into and out of engagement with said valve seat with the heating and cooling of said thermostat, and a plunger member shiftably mounted in said casing and serving as a stop for said ball valve on the inclined lever and shiftably mounted in said casing and extending outwardly thereof arranged to engage said ball and manually shift it along said lever and wedge it between the upper wall of said chamber and said lever off of said valve seat.

6. In a combined automatic and manually controlled safety valve mechanism for fluid burners, the combination with a burner, of a casing provided with a fluid inlet at its upper side and a fluid outlet at its lower side, a ball valve positioned in said casing seated against said fluid inlet, an inclined lever fulcrumed near its higher end and serving as a support for the ball valve at its lower free end, thermostat means in operative relation with the higher end of said lever arranged to lower said lever at its free end when the thermostat is hot for lowering the ball away from the inlet and opening the valve and for raising said free end of the lever and said ball against said inlet when the thermostat is cold, and a plunger member shiftably mounted in said casing serving as a stop for said ball on said lever and shiftably mounted in said casing and extending outwardly thereof arranged to engage said ball valve for manually shifting it along said lever and wedging it between the upper wall of said chamber and said lever to one side of said fluid inlet.

JOHN S. ANDREWS.